United States Patent [19]

Khurana

[11] Patent Number: 4,764,060
[45] Date of Patent: Aug. 16, 1988

[54] QUICK-CHANGE ADJUSTABLE CLOCKING NOSEPIECE

[75] Inventor: Sudershan K. Khurana, Marietta, Ga.

[73] Assignee: Lockheed Corporation, Calabasas, Calif.

[21] Appl. No.: 39,563

[22] Filed: Apr. 16, 1987

[51] Int. Cl.⁴ .............................................. B23B 45/14
[52] U.S. Cl. ...................................... 408/14; 408/97; 408/113; 408/202
[58] Field of Search ................. 408/14, 110, 113, 186, 408/202, 203, 99, 102, 97, 100, 101, 141, 137, 138, 408, 56, 61

[56] References Cited

U.S. PATENT DOCUMENTS

| | | | |
|---|---|---|---|
| 2,359,859 | 10/1944 | Jarvis | 408/202 |
| 2,710,549 | 6/1955 | Cogsdill | 408/202 |
| 3,060,772 | 10/1962 | Crump | 408/202 |
| 3,487,729 | 1/1970 | Juhasz et al. | 408/14 |
| 3,527,273 | 9/1970 | Falter | 408/113 |
| 3,767,313 | 10/1973 | Bohoquez et al. | 408/137 |
| 4,538,943 | 9/1985 | Clifton et al. | 408/14 |
| 4,588,334 | 5/1986 | Khurana | 408/61 |
| 4,668,134 | 5/1987 | Vindez | 408/97 |

*Primary Examiner*—Gil Weidenfeld
*Assistant Examiner*—Daniel W. Howell
*Attorney, Agent, or Firm*—Vangelis Economou; Eric R. Katz

[57] ABSTRACT

Disclosed is a quick-change nosepiece (10) for a power drill (27) capable of telescoping by very small increments in the longitudinal direction, of angular or rotational displacement, and of quick and easy engagement and disengagement so as to provide access to the drill bit (29). Alternatively, a nosepiece (10) may be changed with one of greater or lesser length to correspond to the length of the drill bit (29) as the bit is changed.

14 Claims, 3 Drawing Sheets

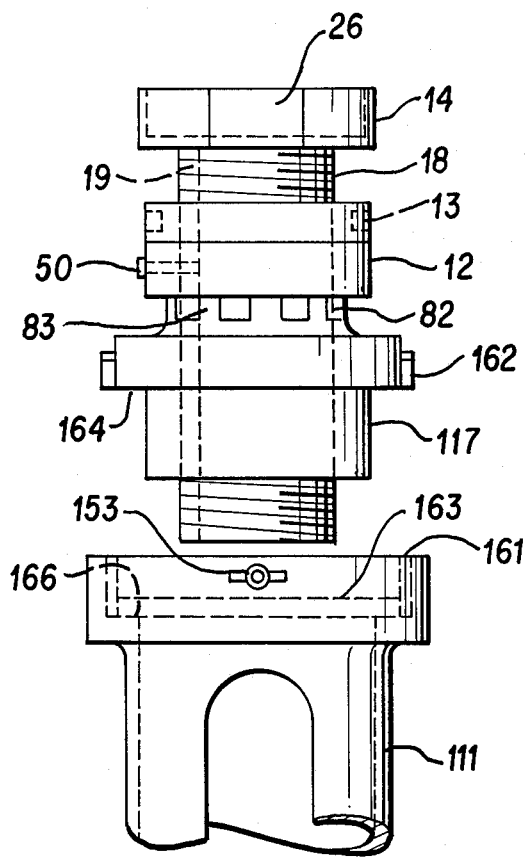
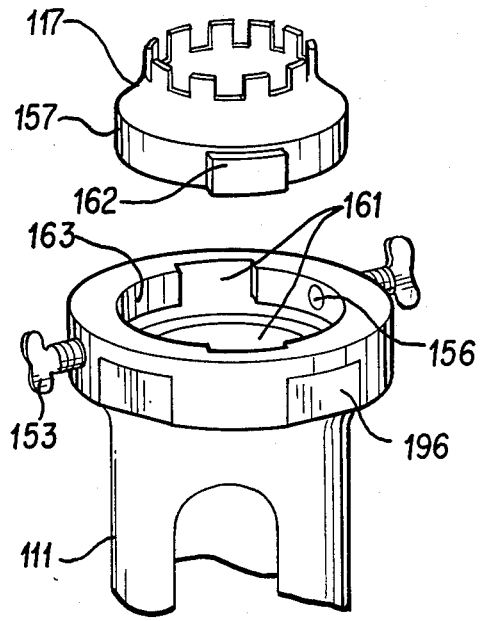
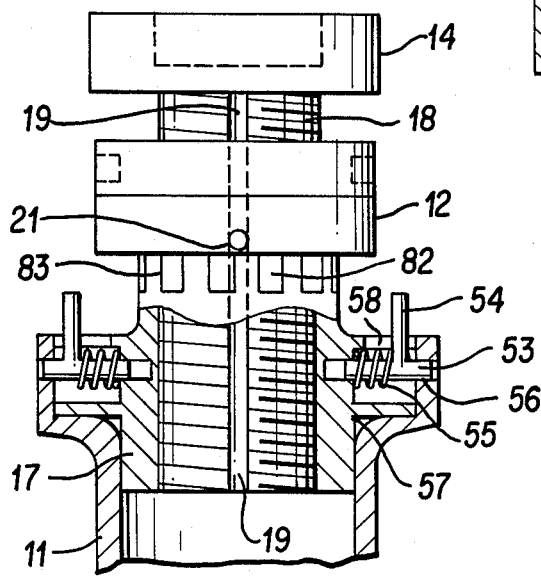
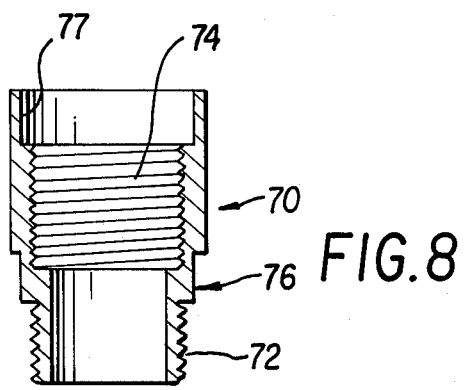

QUICK-CHANGE ADJUSTABLE CLOCKING NOSEPIECE

TECHNICAL FIELD

This invention relates in general to generating holes in a workpiece, and in particular, to an accessory to a power drill for generating holes of a predetermined depth and diameter and in a predetermined pattern on the workpiece, the accessory being easily and quickly changeable by the power drill opeator.

BACKGROUND ART

In the past, power drills have been used to produce holes in a workpiece. Also, in the past accessories known as nosepieces have been used with power drills to fasten the drill into a drill jig or similar positioning device so that a hole produced would be properly positioned on the workpiece. Also, nosepieces served to protect the drill bit from damage and to provide a conduit to carry coolant to the drill bit or other cutting tool and to the point on the workpiece being drilled.

In the past, however, when it was necessary to change the length of the drill bit being used, a specific nosepiece was required because there was no nosepiece with an adjustable length dimension available. Thus, it was necessary to keep a tool inventory which included a nosepiece for each drill bit length.

Additionally, the radial relationship between the nosepiece coolant port and the workpiece being drilled could only be changed by disassembling the drill and nosepiece and reassembling them by shimming between nosepiece and power drill to achieve correct positioning of coolant port position with respect to workpiece. Shimming process is continued until proper positioning is achieved. This requires that an inventory of specially designed shims be carried. Such a method is time consuming and costly because of the large tool inventory required for each drill and drill bit, especially when changing the drill bits after drilling every few holes.

Furthermore, changing nosepieces was itself a time consuming process requiring the unscrewing of the nosepiece to be removed and the screwing on of the nosepiece required for a particular job.

Past efforts made in regards to an adjustable nosepiece utilize a threaded drill motor over which the threaded bore of the nosepiece is engaged. For instance, U.S. Pat. No. 4,538,943 issued to Clifton, et al., describes such a device and also having a locking means whereby the nosepiece may be locked into a predetermined position during each rotation of the nosepiece relative to the drill motor body. This provides a rough linear adjustability for the nosepiece that is dependent on the fineness of the threaded bore.

U.S. Pat. No. 4,588,334, issued to Khurana, the inventor of this application, provides for a clocking mechanism for locking the nosepiece in a predetermined position relative to the drill motor body. The clocking mechanism of U.S. Pat. No. 4,588,334 provides for a much finer adjustment of the nosepiece, both in the linear and in the rotational directions. Depending on the number of teeth in the U.S. Pat. No. 4,588,334 device, the incremental linear adjustability has been decreased by a factor of approximately 20 from that of the Clifton device.

An attendant problem persists with these prior art devices, however, in that if the nosepiece requires an adjustment of a length greater than the threaded length of the nosepiece bore, the complete nose-piece mechanism requires removal and replacement with a nosepiece of suitable length. This problem may arise when the drill bit requires replacement with a much shorter or longer drill bit, but also because of other considerations. The replacement of the nosepiece mechanism in the prior art devices remains a lengthy and tedious process whereby the nosepiece is completely unscrewed from the drill motor body. Thus, it can be readily seen that the prior art nosepiece accessories available for use with power drills do not deal with the problem of linear adjustability of relatively large dimensions.

DISCLOSURE OF THE INVENTION

Accordingly, it is an object of the present invention to provide a nosepiece accessory for a power drill that can be adjusted with respect to the drill in relatively large dimensions while simultaneously having the capability of extremely fine linear and rotational adjustments.

It is also an object of the present invention to provide a nosepiece accessory for a power drill that can be quickly and easily attached to and detached from the power drill motor.

It is also an object of the present invention to provide a nosepiece accessory which allows the quick change capability so that different nosepieces may be substituted to achieve various necessary functions, such as deep drilling, shallow drilling, coolant injecting, vacuum removal of chips and/or coolant, etc.

The principal feature of the present invention is the provision of a unique nosepiece accessory for a power drill which can be used with a variety of drill bits of different lengths and which can also be quickly and easily removed to allow for changing of drill bits of different lengths.

In accordance with the present invention, a nosepiece is provided for a power drill, which, when attached to the drill and positioned in a drill jig, properly positions the drill with respect to a piece being drilled. The nosepiece is in the form of a generally cylindrical first housing which encloses the drill spindle and a drill bit attached thereto, means for attaching the cylindrical first housing to a drill motor and varying both the linear and radial relationships between the housing and the drill bit; bushing means connected on one end to the housing and on the opposite end to a drill jig so that the entire assembly is positioned with respect to a workpiece and so that the drill bit must pass through the bushing to contact the workpiece; a clocking means for adjusting and fixing the linear and radial positions of the housing with respect to the drill bit and the workpiece; and an engagement mechanism for easily and quickly engaging and disengaging the first housing from a second housing which also encloses the drill bit and drill spindle.

Another feature of the present invention is the quick change engagement mechanism which comprises an alignment means for aligning the first and second housings and a locking means for releasably locking the two housings in a predetermined locking position.

Still another feature of the present invention is the ability to design the structural details of the engagement mechanism to suit the particular needs of the drilling operation. For instance, the alignment means may comprise one or more pins on one housing and alignment slots on the other housing for receiving the pins or the pins and slots may be reversed as to which housings contain them. Similarly, the elements of the locking means may also be disposed on either housing or in a reversed position.

An additional feature of the present invention is the ability of the assembled nosepiece to have coolant injected therein so that the coolant flows through a bushing and onto the drill bit cutting point on the workpiece.

Still another feature of the present invention is the ability of the nosepiece to convey chips and dust away from the drill site during drilling.

Another feature of the present invention is the ability of the nosepiece to accept interchangeable lock collar with bushings without being detached from the drill motor.

Yet another feature of the present invention is the ability of the nosepiece to accommodate drill bits of various diameters merely by changing a coolant bushing which forms a part of the bushing means.

An additional feature of the present invention is the capability of the nosepiece to be firmly but removably secured to a drill jig or template which is attached to the workpiece.

An important advantage of the present invention is the capability to quickly and easily remove one nosepiece from a drill motor, substitute the drill bit being used with a drill bit of greater or lesser length than the one being used, and either quickly and easily re-engage the original nosepiece and quickly adjust its length or quickly and easily engage a nosepiece of greater or lesser length corresponding to the length of the drill bit and then make a fine adjustment of the exact nosepiece to drill bit configuration.

Another important advantage of the present invention is the dual capability of the nosepiece to be adjusted in length and angular relationship with respect to the drill bit and busing length used and workpiece being drilled, in both a macro and micro capacity, depending on the need.

An additional advantage is the ability to quickly and easily engage the first housing into a predetermined locking position with great certainty as to the exact location of the nosepiece in relation to the drill motor, the drill bit and the workpiece.

Yet another advantage is the capability to provide for nosepieces which can be altered as to their function, e.g. for providing vacuum or coolant to the work area, and also for adjustment of nosepiece length by providing extender or connector fitting so as to lengthen the effective dimensions of the nosepiece.

In accordance with these and other objects, features and advantages of the present invention, there is provided a nosepiece for a power drill, the power drill having a drill motor, a drill spindle, and a drill bit attached to the spindle which comprises a generally cylindrical first housing which encloses the drill bit and drill spindle; a second housing easily engagable and attachable to the first housing; an engagement means for releasably attaching the first housing to the second housing; an attachment mechanism for attaching the second housing to the drill motor and varying both the linear and radial relationships between the second housing, the drill bit and the drill motor; bushing means connected on one end to the first housing and on the opposite end to a drill jig so that the drill bit must pass through the bushing means to contact a workpiece; and clocking means for adjusting and fixing the linear and rotational positions of the second housing with respect to the drill bit, the workpiece and the drill motor.

Also in accordance with the present invention, the attachment means for attaching the second housing to the drill motor comprises an adapter circumferentially threaded to telescopically engage the second housing so that a variable relationship is created between the linear and rotational positions of the second housing, the drill bit and the workpiece; and means for coupling the adapter with the drill motor.

In accordance with the present invention the clocking means comprises a slip ring which surrounds the adapter and which has one edge notched to engage a complimentary notched edge on the adjacent end of the second housing; a pin projecting from the inner periphery of the slip ring to engage a slot running parallel to the long axis of said adapter and from end to end along the outer periphery of the adapter so that the position of the slip ring on the adapter may be varied along the longitudinal axis of the adapter but the rotational position of the slip ring remains fixed in relation to the adapter and drill motor; and a jam nut positioned between the slip ring and the shoulder of the adapter for locking the slip ring securely in place when the notches or teeth of the second housing and the slip ring are engaged.

In accordance with the present invention, the first housing further comprises a removable adapter accessory having a coolant entry port so that coolant can be injected into the nosepiece and made to flow around the drill bit.

In accordance with the present invention the first housing further comprises chip windows cut into the sides of the housing so that chips and dust can be removed from the area being drilled.

In accordance with the present invention the first housing further includes means for mounting the bushing means within the end of the housing that is opposite the second housing.

In accordance with the present invention the bushing means comprises a lock collar and a complimentary lock bushing, the inside diameter of which is determined by the diameter of which is determined by the diameter of the drill bit being used.

Further in accordance with the present invention, the attachment mechanism comprises an alignment means for aligning the first housing and the second housing in a predetermined locking position and a locking means releasably locking the first and second housings together in the predetermined locking position.

In accordance with the present invention, the engagement mechanism alignment means further comprises at least one alignment pin and at least one corresponding alignment slot, one each on either the first or second housings, for aligning the two housings into a predetermined locking position, and the locking means comprises at least one locking pin on one housing and a corresponding locking cavity on the other of the two housings so that the locking pin projects into the locking cavity, the locking means securely and releasably retains the two housings in the predetermined locking position.

In accordance with the present invention the bushing means further includes means for delivering coolant to the drill bit and the work piece at the point of contact between the drill bit and the workpiece.

These and other objects, features and advantages of the present invention will become more readily apparent with a reading of the following more detailed description of the preferred embodiment in conjunction with the accompanying drawings and claims. The drawings in which like reference characters indicate corresponding parts in all views are not necessarily to scale, emphasis instead being placed on illustrating the principles of the invention.

BRIEF DESCRIPTION OF THE DRAWINGS

FIG. 4 is a side view of a third embodiment of the adapter, second housing and a partial sectional view of the first housing in a non-engaged position.

FIG. 5 is an isometric view of a part-sectional first housing and the second housing of the nosepiece shown in the embodiment of FIG. 4.

FIG. 6 is a part-sectional side view of the nose-piece of the embodiment shown in FIG. 1.

FIG. 7 is a detailed view of the locking pin element of the device shown in FIG. 6.

FIG. 8 is a cross-sectional view of an extender adapter accessory.

BEST MODE OF CARRYING OUT THE INVENTION

Figure 1:
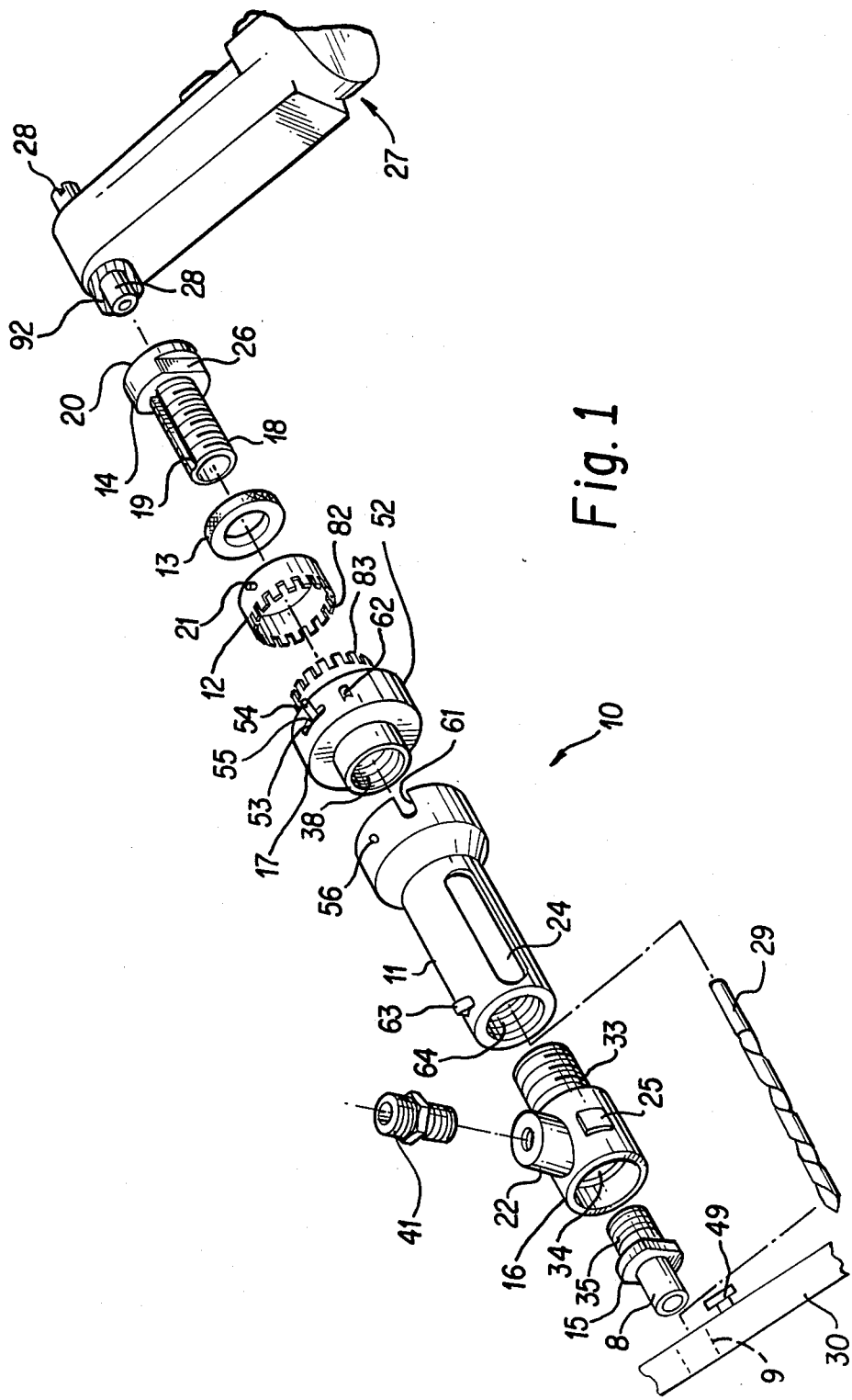
FIG. 1 is an exploded view of one embodiment of the nosepiece of the present invention.

Referring now to FIG. 1, a quick-change nosepiece according to the present invention is shown for attachment to a drill motor 27 and for guiding a drill bit 29 into a workpiece (not shown) through an optional template or jig 30. The nosepiece includes a first housing 11, a slit ring 12, a jam nut 13, an adapter 14, a lock collar holder 15, an adapter accessory 16 and a second housing 17.

The adapter 14 provides an attachment means for attaching the second housing 17 to the drill motor 28 by fitting the adapter 14 over the drill spindle 28 with the drill bit 29 attached to the drill spindle with a drill chuck (not shown). When assembled, nosepiece 10 attaches to the drill motor 27 by means of threads 20 on the interior of the adapter 14 and external threads 92 on drill motor 27.

The coupling of nosepiece 10 and the drill motor 27 is done in such a way that the drill spindle 28 and any attached drill bit 29 project into and through the central bore of nosepiece 10. Adapter 14 is circumferentially threaded 18 along its length so that it may be threaded into the second housing 17, which has internal threads 28 along all of its length. Longitudinal slot 19 is cut into one side of adapter 14 and slip ring pin 21 is engaged thereby so that slip ring 12 can move longitudinally along adapter 14 but is prevented from rotational movement about adapter 14. When the housing 17 is properly adjusted with respect to the length of the drill bit 29 and the angular position of the first housing 11, slip ring 12 is pushed against second housing 17 such that slip ring notches 82 and housing notches 83 mesh. Slip ring 12 is then locked in this position by tightening jam nut 13 firmly against its unnotched end. When this is accomplished the linear and angular position of the nosepiece is fixed until a change is made necessary by the shape of the workpiece or length of the drill bit 29, or length of bushing 8, and nosepiece 10 is locked into drill jig 30.

First housing 11 is attached to second housing 17 by an engagement means which allows quick and easy engagement into a predetermined locking position. When fully assembled and engaged in the predetermined locking position, at least one aligning pin 62 on the second housing 17 will slide into aligning slot 61 on the first housing 11. Also, locking pin 53 will project into a corresponding cavity 56 or disposed on first housing 11. As will be shown in another embodiment, however, the location of any of these elements is not necessarily significant, and they may be reversed. For instance, the locking pin 53 may be disposed on the first housing 11 and corresponding receiving cavity 56 on the second housing 17.

When assembled, the nosepiece adapter accessory 16 will be screwed into a threaded bore 64 in the distal end of the first housing 11 by means of screw threads 33, and will also be ready to receive lock collar holder 15 in its threaded bore 34. Connector adapters, such as extender adapter 70, shown in FIG. 8, may be placed between coolant port 22 and first housing 11, in order to increase the effective length of the nosepiece 10 by a macro distance. It is the purpose of the extender 70 to provide the capability of connecting other connectors, such as the coolant port 22, by screwing them into the internal threaded bore 74 of the extender connector 70. Thus, external threads 72 of the extender connector 70 will become available to screw into the first housing threaded bore 64.

It is also possible to combine a series of extender connectors by screwing the external thread 72 of one into the internal thread 74 of the next extender adapter 70'. When fully assembled, projected annular ring 76 will be directly adjacent to the unthreaded part of the counterbore 77 of the next extender adapter 70'. This capability of adapting the effective length by macro increments increases the operator's efficiency.

Referring now to FIGS. 6 and 7, the device of FIG. 1 is shown in an assembled state and the first housing 11 in an engaged position with the second housing 17. When the first and second housings are engaged in the predetermined locking position, locking pin 54 is biased by a spring 53, or other biasing means, so that locking pin 54 projects into cavity or hole 56. FIG. 7 is a detail drawing of the locking pin mechanism in the predetermined locking position. Alignment pin 62 on second housing 17 and alignment slot 61, on the first housing 11 are not shown in FIG. 6 as both housings are shown in cross-sectional views and those elements would have been on the cross-sectional portions.

The locking pin 53 is retractable by means of an actuating pin 54 on which force may be exerted to counter the biasing force of spring 53. A cavity 57 is provided in second housing 17 for pin 53 to retract, and a slot 58 is provided for movement of the actuating 54 in second housing 17. When both of the pins shown in FIG. 6 are retracted, the locking means is released and the engagement mechanism is disengaged. This procedure allows the first housing 11 to be slidably removed from the second housing 17, and to substitute the appropriate nosepiece in its place quickly and easily without requiring long screwing and unscrewing procedures.

Figure 2:
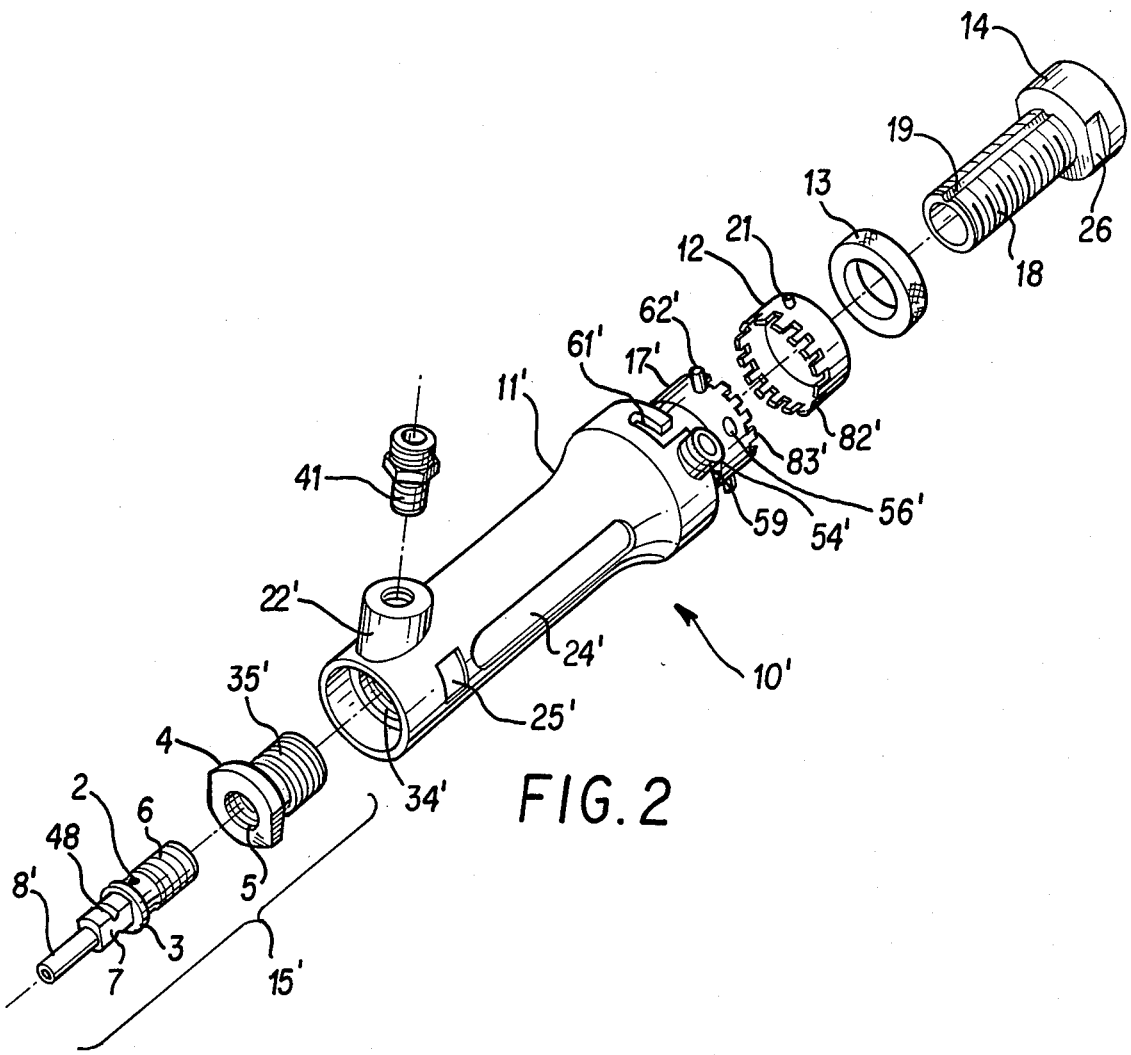
FIG. 2 is an exploded view of another embodiment of the nosepiece of the present invention.
Figure 3:
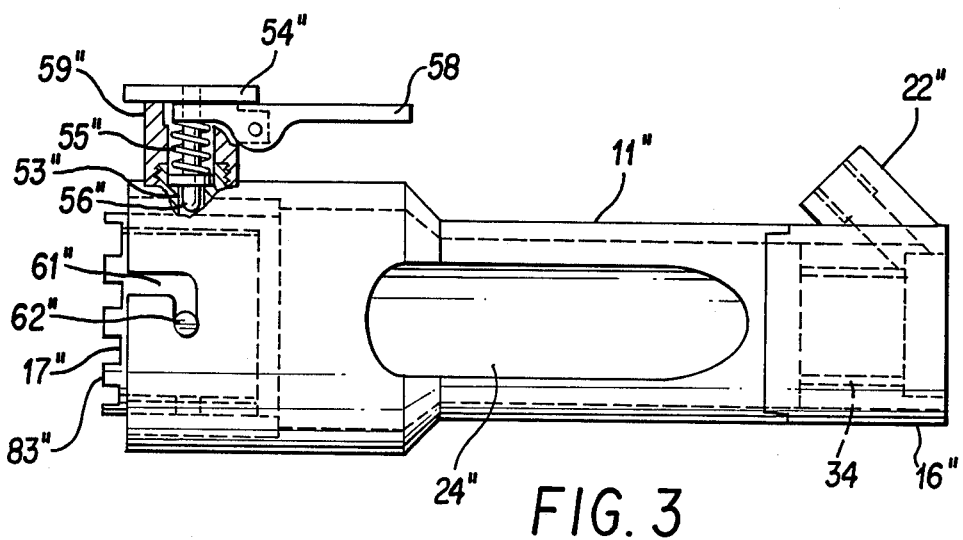
FIG. 3 is a side view of the nosepiece first and second housings in the predetermined locking position showing a partially sectional view of the locking means.

Referring now to FIGS. 2 and 3, like referenced characters indicate corresponding parts to the embodiments shown in FIGS. 1, 2 and 3. Where a corresponding part is similar but not identical between FIGS. 1, 2 and 3, the same reference character is used with a prime designation (') for FIG. 2 and a double prime designation (″) for FIG. 3. Although the function of the corresponding parts between the different embodiments shown in FIGS. 1, 2, and 3 are the same, there are certain variations in detail of the structure.

For instance, in FIG. 2, the nosepiece 10′ comprises a first housing 11′ which is integral with the coolant port 22′. Coolant fitting 41 is screwable into the threaded bore of the coolant port 22′. More importantly, the engagement mechanism for engaging the first housing 11′ to the second housing 17′ is a variant of the engagement mechanism of the FIG. 1 embodiment.

The alignment means of FIG. 2 comprises an alignment pin 62′ on the second housing 17′ which slidably engages into the first housing 11′. First housing 11′ has an alignment slot 61′ for receiving alignment pin 62′. Alignment slot 61′ has an L-shaped configuration for guiding the alignment pin 62′ first housing 11′ as it is engaged with the second housing 17′. The embodiment shown in both FIGS. 2 and 3 have a first housing that is slidable in both the longitudinal and rotational directions in relation to the second housing. The L-shaped alignment slot 17′ need not have a full right angle, but a 1 or 2 degree deviation may be designed into the slot 17′ so as to more securely engage the first and second housings. The alignment pin 62′ may act in a cam action technique against the angled alignment slot 61′ so as to further wedge the first and second housings together.

As the alignment pin 62′ is guided along the alignment slot 61′ and rotated to the closed end of the L-shaped slot, the locking means is effected. Locking means comprises a locking means bracket 59, disposed on the first housing, and which is most clearly shown in FIG. 3 in partial cross-section as locking housing 59″.

Referring now to FIG. 3, the locking pin 53″ is biased by spring 55″ toward the locking cavity 56″ shown in phantom on the second housing 17″. As alignment pin 62″ reaches the end of L-shaped alignment slot 61‴, the locking pin 53″ becomes able to be projected into locking cavity 56″ and is so projected by the biasing spring 55″, thus releasably locking the first and second housings into a predetermined locking position.

Referring now to the locking means of FIG. 2, the locking pin (not shown) projects into locking cavity 56′ in the same way as in the embodiment of FIG. 3. A variation of these two locking means may be seen in the actuating pins 54′ and 54″ connected to the locking pin. Whereas in FIG. 2, the locking pin is releasable by extracting the actuating pin 54′ manually, the FIG. 3 embodiment depicts an actuating pin lever 58 which facilitates the removal of locking pin 53″ from the locking cavity 56″, thus releasing the two housings from the predetermined locking position. To fully disengage the housings, the first housing is then rotated in relation to the second housing and the two housings are then pulled apart. Actuating pin 54′ may also have a rest position whereby rotating the locking pin within bracket 59 allows the actuating pin 54′ to rest on the bracket and the locking pin to remain in the retracted position while a nose-piece is engaged or disengaged.

Referring now to the lock collar bushing holder 15′ shown in FIG. 2, which is a variation of the lock collar holder 15 of FIG. 1, reducer bushing 3 is screwed into threaded bore 5 of the bore reducing member 4 by means of external threads 6. Coolant bushing 8′ is an integral element of reducer bushing 3, and fits into a template or jig hole 9 in template or jig 30 shown in FIG. 1. Reducer bushing 3 further has internal grooves for accepting coolant from the coolant port 22′ and providing the coolant to the drill bit-workpiece interface through coolant hole 2. Reducer bushing 3 further has a lock collar 7 which locks the fully assembled nosepiece 10 into the jig or template 30 by means of cams 48, which operate by locking into screws 49 of the jig 30 shown in FIG. 1.

Referring now to FIGS. 3 and 4, a variation is shown of the engagement means for engaging the first housing 111 to the second housing 117 by means of cam action. Alignment slots 161 of first housing 111 are guided along alignment cams 162 on second housing 117, until surface 166 comes into contact with the surface 164 of the second housing. First housing 111 is then rotated so that cams 162 engage with the surface 163. When no further rotation is possible because of the wedging of cams 162 between surfaces 163 and 166, lock screws 153 are screwed into screw holes 156 until they come into contact with surface 157 of second housing 117, thus locking the two housings into a predetermined locking position. Flats 196 and 26 may be machined onto first housing 111 and adapter 14 respectively to facilitate the use of wrenches and other such tools in the assembly and disassembly of nosepiece 10.

Although the present invention has been discussed and described with primary emphasis on the preferred embodiments, it should be obvious that adaptations and modifications can be made thereto without departing from the spirit and scope of the invention.

I claim:

1. A quick change nosepiece for a power drill having a drill motor, a drill spindle and a drill bit attached to the drill spindle, comprising:
   (a) a first housing having a proximate end and a distal end for enclosing the drill bit and the drill spindle;
   (b) a second housing having a distal end for attachment to said proximate end of said first housing, and a proximate end;
   (c) attachment means for attaching said proximate end of said second housing to the drill motor;
   (d) clocking means for varying both the linear and the rotational relationships between said second housing and the drill bit;
   (e) bushing means having a proximate end for attachment to said distal end of said first housing and a distal end for attachment to a drill jig such that the drill bit passes through said bushing means to contact a workpiece;
   (f) engagement means for attaching said proximate end of said first housing and said distal end of said second housing, said engagement means including:
      (i) an alignment means for aligning said first housing and said second housing in a predetermined locking position; said alignment means having:
         (a) at least one alignment pin disposed on one of said housings:
         (b) at least one corresponding alignment slot disposed on the other of said housings, said at least one alignment slot having an open end and a closed end and being adapted to receive at least one alignment pin and to guide said housings into said predetermined locking position; and
      (ii) a locking means for releasably locking said first and second housings together in said pedetermined locking position, said locking means having:
         (a) at least one locking pin disposed on one of said housings; and (b) at least one corresponding cavity disposed on the other of said housings being adapted to receive said at least one locking pin when said housings are in said predetermined locking position.

2. A quick-change nosepiece according to claim 1, wherein said at least one alignment pin further comprises a pair of alignment pins diametrically disposed on one of said housings, and said at least one corresponding alignment slot further comprises a pair of alignment slots diametrically disposed on the other of said housings.

3. A quick-change nosepiece according to claim 2, wherein said pair of alignment slots are generally L-shaped.

4. A quick-change nosepiece according to claim 1, wherein said engagement mechanism further comprises biasing means for maintaining said at least one locking pin biased in said at least one corresponding cavity while said housing are in said predetermined locking position, and said engagement mechanism further having a pin retention means for maintaining said pin in an unlocked position permitting release of said housings from one another.

5. A quick-change nosepiece according to claim 1, wherein said locking means further comprises two locking pins diametrically disposed on one of said housings and two corresponding cavities diametrically disposed on the other of said housings adapted to receive said locking pins and to secure said housings in said predetermined locking position, said locking pins projecting into said cavities in a locked position and said alignment pins being fixed at said closed end of said alignment slots while said housings are secured in said predetermined locking position.

6. A quick-change nosepiece according to claim 4, wherein said two locking pins further comprise biasing means for maintaining said locking pins in said locked position and said locking pins further having an unlocked position allowing sldable linear and rotational displacement of said housings in relation to each other.

7. A quick-change nosepiece according to claim 1, wherein each of said corresponding alignment slots are generally L-shaped.

8. A quick-change nosepiece according to claim 1, wherein each of said corresponding alignment slots are at a predetermined angle in relation to a longitudinal axis of said housings, whereby said slot works a cam action on said alignment pin as it guides said first housing and said second housing into said predetermined locking position.

9. A quick-change nosepiece according to claim 1, wherein said at least one corresponding alignment slot is a through-cut aperture in one of said housings.

10. A quick-change nosepiece according to claim 1, wherein said at least one corresponding alignment slot forms a groove, whereby a wall of said housing containing said alignment slot is generally U-shaped and encircles said at least one alignment pin.

11. A quick-change nosepiece according to claim 1, wherein said distal end of said first housing further comprises a threaded connecting portion for accepting at least one adapter accessory.

12. A quick-change nosepiece according to claim 11, wherein said at least one adapter accessory comprises a coolant fitting having a coolant entry port whereby coolant can be injected into said nosepiece and made to flow around the drill bit substantially at the point of contact between the drill bit and the workpiece.

13. A quick-change nosepiece according to claim 11, wherein said at least one adapter accessory comprises a vacuum fitting having a vacuum port whereby loose chips, dust and coolant may be removed.

14. A quick-change nosepiece according to claim 11, wherein said at least one adapter accessory comprises a connector fitting having threaded bore at one end and a threaded shaft at the opposite end such that said connector fitting effectively increases the total longitudinal dimension of said first housing by a predetermined length.

* * * * *